(12) United States Patent
Hermann et al.

(10) Patent No.: US 10,081,545 B2
(45) Date of Patent: Sep. 25, 2018

(54) PROCESS AND PLANT FOR SEPARATING HEAVY METALS FROM PHOSPHORIC STARTING MATERIAL

(71) Applicant: Outotec (Finland) Oy, Espoo (FI)

(72) Inventors: Ludwig Hermann, Auersthal (AT); Günter Schneider, Lorsch (DE); Dirk Lohrberg, Offenbach (DE)

(73) Assignee: Outotec (Finland) Oy, Espoo (FI)

( * ) Notice: Subject to any disclaimer, the term of this patent is extended or adjusted under 35 U.S.C. 154(b) by 455 days.

(21) Appl. No.: 14/888,315

(22) PCT Filed: May 3, 2013

(86) PCT No.: PCT/EP2013/059285
§ 371 (c)(1),
(2) Date: Oct. 30, 2015

(87) PCT Pub. No.: WO2014/177228
PCT Pub. Date: Nov. 6, 2014

(65) Prior Publication Data
US 2016/0075555 A1 Mar. 17, 2016

(51) Int. Cl.
*C01B 25/26* (2006.01)
*F23G 5/02* (2006.01)
(Continued)

(52) U.S. Cl.
CPC .............. *C01B 25/265* (2013.01); *B01J 8/24* (2013.01); *C05B 17/00* (2013.01); *F23G 5/02* (2013.01);
(Continued)

(58) Field of Classification Search
None
See application file for complete search history.

(56) References Cited

U.S. PATENT DOCUMENTS 4,450,146 A * 5/1984 Klepeis ................... C01B 25/12
122/4 D
4,618,483 A * 10/1986 Spruill ................... B01J 8/1836
423/304
(Continued)

FOREIGN PATENT DOCUMENTS

DE 102 43 840 A1 3/2004
EP 0908673 A1 4/1999
(Continued)

OTHER PUBLICATIONS

Office Action prepared by the Korean Patent Office for KR 10-2015-7034194, dated Apr. 29, 2017, 14 pages.
(Continued)

*Primary Examiner* — Melissa S Swain
(74) *Attorney, Agent, or Firm* — Chernoff Vilhauer LLP

(57) ABSTRACT

A process for separating heavy metals from phosphoric starting material comprises the following steps:
  (i) heating the starting material to a temperature of 600 to 1.200° C. in a first reactor (1) and withdrawing combustion gas;
  (ii) using the combustion gas of step (i) to preheat an alkaline source; and
  (iii) transferring the heated starting material of step (i) and the heated alkaline source of step (ii) to a second reactor (20), adding an elemental carbon source, heating to a temperature of 700 to 1.100° C. and withdrawing process gas and a product stream.

13 Claims, 1 Drawing Sheet

(51) Int. Cl.
*F23G 7/00* (2006.01)
*B01J 8/24* (2006.01)
*C05B 17/00* (2006.01)
C02F 9/00 (2006.01)
C02F 11/00 (2006.01)
C02F 11/06 (2006.01)
C02F 101/20 (2006.01)

(52) U.S. Cl.
CPC ............... *F23G 7/001* (2013.01); *C02F 9/00* (2013.01); *C02F 11/004* (2013.01); *C02F 11/06* (2013.01); *C02F 2101/20* (2013.01); *F23G 2201/302* (2013.01); *F23G 2201/303* (2013.01); *F23G 2209/12* (2013.01); *Y02W 10/40* (2015.05)

(56) References Cited

U.S. PATENT DOCUMENTS

| | | | | |
|---|---|---|---|---|
| 9,399,592 | B2* | 7/2016 | Brulhart | C02F 11/00 |
| 2005/0039638 | A1* | 2/2005 | Leung | C04B 7/43 |
| | | | | 106/745 |
| 2009/0183543 | A1* | 7/2009 | Boutoussov | C22B 1/08 |
| | | | | 71/32 |
| 2013/0272944 | A1* | 10/2013 | Edlinger | C01B 25/01 |
| | | | | 423/322 |

FOREIGN PATENT DOCUMENTS

| | | | |
|---|---|---|---|
| JP | 045272/1979 | A | 10/1980 |
| JP | 2000-279919 | A | 10/2000 |
| JP | 2003-112988 | A | 4/2003 |
| JP | 2003112988 | A * | 4/2003 |
| JP | 2006-003013 | A | 1/2006 |
| JP | 2009-242202 | A | 10/2009 |
| JP | 2010-227742 | A | 10/2010 |
| KR | 10-2002-0009165 | A | 2/2002 |
| KR | 10-2012-0129879 | | 11/2012 |
| WO | 2006/072982 | A1 | 7/2006 |
| WO | 208104250 | A1 | 9/2008 |
| WO | 2013190116 | A1 | 9/2008 |

OTHER PUBLICATIONS

PCT, International Search Report for corresponding International Application No. PCT/EP2013/059285, dated Feb. 7, 2014, pp. 4.
PCT, International Preliminary Report on Patentability for corresponding International Application No. PCT/EP2013/059285, dated Aug. 7, 2015, pp. 16.
Adam C et al.: "Thermochemical Treatment of Sewage Sludge Ashes for Phosphorus Recovery", Waste Management, Elsevier, New York, NY, US, vol. 29, No. 3, Mar. 1, 2009 (Mar. 1, 2009), pp. 1122-1128, XP025769686, ISSN: 0956-053X, DOI: 10.1016/J.WASMAN.2008.09.011.
Notification of Reason for Refusal prepared by the Japanese Patent Office for JP 2016-510952, dated Dec. 20, 2016, 9 pages.

* cited by examiner

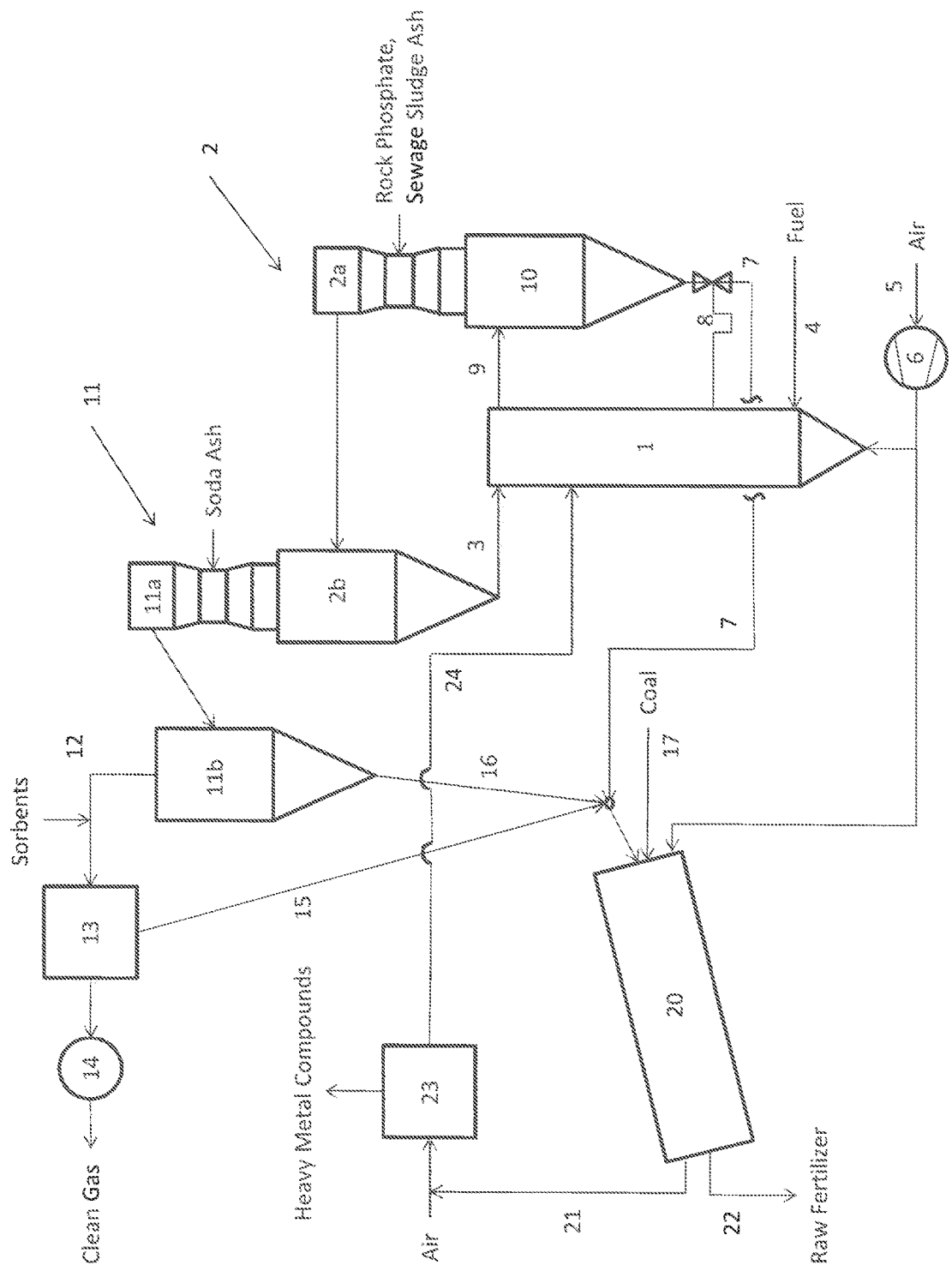

PROCESS AND PLANT FOR SEPARATING HEAVY METALS FROM PHOSPHORIC STARTING MATERIAL

CROSS-REFERENCE TO RELATED APPLICATIONS

This is a national stage application filed under 35 USC 371 based on international Application No. PCT/EP2013/059285 filed May 3, 2013.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

The present invention is directed to a process and a plant for separating heavy metals from phosphoric starting material.

BACKGROUND OF THE INVENTION

Phosphate is a very important nutrient for the photosynthesis of plants so that more than 90% of the global production of phosphate is processed to phosphorus fertilizers. The availability of phosphorus, however, is limited. In order to enhance the limited availability of phosphoric material there have been efforts to use sewage sludge ash, which often contains a considerable amount of phosphorus and which usually is disposed of in a landfill, as a source to recover phosphorus. It has been proposed to burn phosphorus containing sewage sludge to obtain a phosphorus containing ash with a phosphorus content of 8 to 20 wt.-%. The main chemical components of the resulting sewage sludge ashes are $SiO_2$, $CaO$, $Al_2O_3$, $Fe_2O_3$ and $P_2O_5$. The ashes, however, also contain heavy metals, such as lead, cadmium, arsenic, chrome, copper, nickel, zinc or mercury As the content of these elements exceeds the limits provided by official regulations and as the plant availability of its phosphate compounds is poor, the sewage sludge ash as such cannot be used as fertilizer and has to be processed beforehand.

Application PCT/EP2012/061986 describes a process for the separation of heavy metals from phosphorus-containing sewage sludge ash, wherein the starting material is heated to a temperature of between 700° C. and 1.100° C. in a first reactor, combustion gases are withdrawn and the heated starting material is transferred to a second reactor where chlorides of alkaline and earth alkaline metals are added.

It is also known from the prior art (see Böhm, H., Werner W., "Entwicklung und Erprobung eines Verfahrens zur chemisch-thermischen Verarbeitung P-haltiger Klärschlammasche zu Düngerphosphaten", German Federal Ministry of Research and Technology, Research Report T 81-127, July 1981) to heat a mixture of soda, phosphate-containing sewage sludge ash and sand to a temperature of between 1.100° C. and 1.250° C. in a rotary kiln. There are numerous technical disadvantages to this process: firstly heavy metals that are present in the starting material will not be removed from the resulting fertilizer; secondly the process is very energy intensive because the air within the rotary kiln, although not used in the process, needs to be heated in order to retain the required reaction temperature.

BRIEF SUMMARY OF THE INVENTION

It is the object of the present invention to provide for a reliable separation of heavy metals from phosphoric material in an energy efficient way which is also easier to operate and less cost intensive than the processes of the prior art.

This problem is solved by the present invention in a process comprising the following steps:

(i) heating the starting material to a temperature of 600 to 1.200° C., preferably 700 to 1.100° C., in a first reactor and withdrawing combustion gas;

(ii) using the combustion gas of step (i) to preheat an alkaline source; and (iii) transferring the heated starting material of step (i) and the preheated alkaline source of step (ii) to a second reactor, adding an elemental carbon source, heating to a temperature of between 700 to 1.100° C. and withdrawing process gas and a product stream.

The process according to the invention uses an alkaline source to convert the phosphorous contained in the starting material into soluble phosphate compounds. Preferably, the alkaline source is selected from the group consisting of sodium carbonates, sodium hydroxides, potassium carbonates and potassium hydroxides. Most preferably the alkaline source is $Na_2CO_3$ (soda ash). Preferably, the alkaline source is added in an amount of 2-80 wt.-%, preferably 10-50 wt.-% of the starting material.

According to the invention, elemental carbon is used to reduce the heavy metal components of the starting material for subsequent elimination. Preferably, the elemental carbon source is selected from the group consisting of pulverized lignites, dry sewage sludge or dry biomass. Most preferably, the elemental carbon source is pre-dried sewage sludge. Preferably, the elemental carbon source is added in an amount of 1-40 wt.-%, preferably 3-15 wt.-% of the starting material.

In order to reach the temperatures inside the first reactor of step (i), it is preferred that a mixture of air and fuel are supplied to said first reactor. Generally, any fuel capable of producing the required temperatures inside the first reactor can be used. Preferred fuels according to the invention are natural gas, sewage sludge and phosphorus containing biomass such as farmyard manure or animal by-products.

It is preferred that the starting material is pre-heated to a temperature of 300 to 800° C., preferably 400 to 600° C., and more preferably 520-580° C., prior to the heating in the first reactor of step (i). Said pre-heating is preferably done in multiple stages in order to cool down the combustion gas to a suitable temperature for the preheating of the alkaline source. If soda ash is used as alkaline source, its melting point is 851° C., so that it should not be directly contacted with the hot combustion gas exiting the first reactor.

According to the invention the alkaline source is preheated in a second preheating stage to a temperature of 200 to 500° C., preferably 300 to 400° C., prior to the introduction into the second reactor.

The process according to the invention is advantageous compared to the state of the art in several aspects.

Since the major amount of flue gas is generated in the first reactor of step (i), the dimensions of the second reactor in step (iii) can be significantly reduced. Furthermore, there is no need to heat gaseous compounds in the second reactor in step (iii) that are not used in the reaction, thereby drastically reducing energy requirements compared to the state of the art processes.

The pre-heating of the alkaline source in step (ii) of the process according to the invention further reduces the energy necessary to heat the second reactor in step (iii).

The mixture of the alkaline source and the elemental carbon source in the second reactor in step (iii) enhances the decomposition of the alkaline source and therefore the formation of soluble phosphate compounds.

It is preferred that the process gas in step (iii) is cooled below the condensation temperature of the heavy metal compounds to allow for their precipitation and removal.

The remaining, phosphorus rich solids leave the reactor and are conveyed to a finishing section to manufacture straight phosphorus or complex fertilizer.

The phosphorus rich solids withdrawn from the second reactor in step (iii) may be mixed with a high grade straight phosphorus carrier and/or a nutrition carrier to obtain highly valuable phosphate fertilizer. The solids may be homogenized and granulated to facilitate the further handling.

According to the present invention the combustion gases from step (i) are fed into a cyclone separator and subsequently into a Venturi section of the first preheating stage.

Subsequently, the combustion gases are withdrawn from the cyclone separator, enter a Venturi section of a second preheating section and are admixed with an alkaline source according to step (ii).

The present invention is also directed to a plant for separating heavy metals 15 from phosphoric starting material which is suitable for performing the process as described above. The plant comprises a first reactor for heating the material having at least one line for withdrawing combustion gas, a first preheating stage for preheating the starting material, a second preheating stage for heating an alkaline source, and a second reactor for heating the heated starting material and the preheated alkaline source as well as an elemental carbon source having at least one line for withdrawing process gas and at least one line for withdrawing a product stream.

Preferably, the first reactor of step (i) is a fluidized bed reactor, operating with an expanded solids surface that ensures an ideal heat transfer. The second reactor in step (iii) preferably is a rotary kiln.

According to a preferred embodiment of the invention, the first and/or the second pre-heating stage each comprises a Venturi section and a cyclone separator. The Venturi section assists in mixing the added material with the hot gas, while in the cyclone separator the solids are separated from the gas and then transferred to the first and second reactor, respectively.

The invention will now be described in more detail on the basis of preferred embodiments and the drawings.

BRIEF DESCRIPTION OF THE OF THE DRAWING

FIG. 1 is a simplified block diagram of a plant implementing the process of the present invention.

DETAILED DESCRIPTION OF THE INVENTION

In the plant shown in FIG. 1, a phosphorous-containing raw or starting material such as sewage sludge or biomass ash or rock phosphate is pneumatically conveyed from non-illustrated storage silos to a first preheating stage 2 comprising a Venturi section 2a and a cyclone separator 2b. Thereby, the starting material is intensively mixed with a hot combustion gas withdrawn from a first reactor 1 and heated to a temperature of 400 to 600° C., preferably about 575° C. In the cyclone separator 2b the solid material is separated from the gas and transferred via line 3 into the first reactor 1, which preferably is a fluidized bed reactor. In the first reactor 1, the preheated starting material is heated by the combustion of fuel, such as natural gas, biomass or sewage sludge supplied through fuel line 4 with air supplied through air line 5. The air may be introduced under elevated pressure via compressor 6. In the first reactor 1 the starting material is heated to a temperature of 700 to 1.100° C., preferably 900 to 1.000° C. and in particular about 950° C.

The thus heated starting material is withdrawn from the first reactor 1 through line 7 and is fed to a second reactor 20, preferably a rotary kiln reactor. The level of the inventory in the first reactor 1 can be controlled by a seal pot 8 such as described in document WO 2008/104250 A, a dip leg seal or the like. The combustion gases are withdrawn from the first reactor 1 through line 9 into a cyclone separator 10 for separating the gas from the solid material. The solid material is withdrawn at the bottom of the cyclone separator 10 and transferred to the second reactor 20 through line 7. The hot combustion gases enter into the Venturi section 2a of the first preheating stage 2 for preheating the starting material.

From the cyclone separator 2b of the first preheating stage 2 the gas is withdrawn at the top and enters a Venturi section 11a of a second preheating stage 11 where soda ash is added as a preferred alkaline source and mixed with the heating gas. The mixture then is transferred into a cyclone separator 11b for separating the solids from the gas. In the second preheating stage 11 the alkaline source is preheated to 300 to 400° C., preferably about 360° C., and then transferred into the second reactor 20 through line 16. The gas is withdrawn at the top of cyclone separator 11b and transferred into separator 13 via line 12, where the solids are separated from the gas after a suitable, calcium or sodium based, sorbent such as calcium hydrate, calcium carbonate or sodium hydrogen carbonate has been added. Finally, after passing through a filter 14, preferably an electrostatic precipitator and other suitable cleaning device, for recovering additional solids that may be introduced into the second reactor 20 though line 15, the clean gas is removed from the plant.

The starting material supplied from the first reactor 1 through line 7 and the alkaline source supplied through lines 15, 16 is introduced into the second reactor 20 and heated therein to a temperature of 700 to 1.100, preferably 900 to 1.000° C. and in particular about 950° C. In addition to the starting material and the alkaline source an elemental carbon source, in particular pre-dried sewage sludge, biomass, pulverized lignite or coal and/or coke, is fed to the second reactor 20 through line 17. Air may be introduced through line 5. The compounds may be mixed before entering the second reactor 20 or supplied separately and mixed within reactor 20, preferably by rotation, Thereby the alkaline source decomposes into X+Y (where X is the alkaline ion and Y is a carbonate or hydrogen anion) and the elemental carbon source reduces the heavy metals to their elemental form. For soda ash the reaction is as follows:

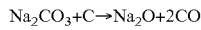

$$Na_2CO_3+C \rightarrow Na_2O+2CO$$

The heavy metals evaporate and leave the second reactor 20 with the process gas through line 21. The remaining, phosphorus rich solids leave the second reactor 20 through a gas-tight outlet and product line 22 and are cooled.

The semi-product withdrawn through product line 22 is free from toxic heavy metals and conveyed to a finishing section (not shown) where it is manufactured to straight phosphorus or complex fertilizers.

The process gas from the second reactor 20 contains the elemental heavy metals. Said process gas is transmitted via line 21 into separator 23 where it is quenched to about 200-400° C. with fresh air or water to condensate the heavy metal compounds to solid particles. These particles are captured in a baghouse filter(not shown) as filter dust. Alternatively, the solids may be separated from the gas by electrostatic precipitation, Until heavy metal recycling will be commercially viable, the filter dust will be deposited as secondary waste. Finally, the purified process gas is fed back into first reactor via line 24.

At the point of leaving the thermo-chemical process, the semi-product already complies with the requirements of the fertilizer act. The concentration of toxic substances and particularly of cadmium and uranium is one to two orders of magnitude below the respective concentrations in phosphate rock based fertilizers.

To comply with the phosphate concentration tolerances required by most fertilizer acts in the order of +/−0.8 percentage points of total $P_2O_5$, a measured amount of a high grade straight phosphorus (P) carrier may be added to the semi-product. For this purpose, the semi-product is analyzed online for its concentration of $P_2O_5$ and one or several guiding heavy metals. Depending on the desired phosphate concentration in the final product, a measured quantity of triple-superphosphate (TSP) or phosphoric acid is admixed and homogenized. Alternatively and for the production of a phosphate fertilizer for organic farming, phosphate rock is used instead of TSP to adjust the P-concentration.

As a first option the product is homogenized and granulated in a mixer-granulator and—depending on the final purpose—finished as dust free powder or as final granules. From this stage, the product has become the final product of the plant that either will be sold to the agricultural product distributors or to fertilizer manufacturers.

As a second option, the plant can be extended to manufacture complex fertilizers by admixture of additional nutrient carriers. This step requires additional silos/storing facilities and the corresponding design of the finishing section of the plant to handle the additional nutrient and fertilizer quantities. In this case, the product and additional nutrient carriers are conveyed and fed to the mixer-granulator in ratios determined by the target fertilizer type. By adding small amounts of water and—depending on the requirements—binders and coating agents, complex fertilizer granules of homogenous composition and a determined corn size distribution are produced that comply with ail requirements in terms of threshold values, tolerances and nutrient solubility.

The raw material, ash, does not contain combustible and halogenic-organic substances. It mainly consists of phosphate, calcium, silicon, iron and aluminum compounds.

The starting material treatment capacity of the plant may be e.g. 4-10 tons per hour. Raw materials are heated by natural gas burners or by combusting sewage sludge or biomass, and energy is efficiently recycled within the plant. Process emissions are effectively controlled by a sequence of adsorption reactors and baghouse filters. The heavy metals are captured as dry filter dust and safely disposed of in a landfill.

Application of the product as a phosphate fertilizer is more environment friendly than using either conventional mineral fertilizers or recycled organic fertilizers. In comparison to conventional mineral fertilizers, concentrations of cadmium and uranium are 1-2 orders of magnitude lower. In comparison to organic fertilizers, no risk of transfer of organic pollutants to the food and feed chain exists.

Additional nutrient carriers are exclusively licensed fertilizers as ammonium sulfate, potassium chloride (MOP), potassium sulfate (SOP) and converter slag. Triple-superphosphate and the finished products will be stored in silos or as bulk material in covered warehouses. Binders and coating agents and—on demand—phosphorus and sulfuric acid are stored in compliance with legal requirements.

LIST OF REFERENCE NUMERALS 1 first reactor
2 first preheating stage
2a Venturi section
2b cyclone separator
3 line
4 fuel line
5 air line
6 compressor
7 line
8 dip leg seal
9 line
10 cyclone separator
11 first preheating stage
11a Venturi section
11b cyclone separator
12 line
13 separator
14 filter
15 line
16 line
17 line
20 second reactor
21 line
22 product line
23 separator
24 line

The invention claimed is:
1. A process for separating heavy metals from phosphoric starting material comprising the following steps:
  (i) heating the starting material to a temperature of 600 to 1.200° C. in a first reactor and withdrawing combustion gas;
  (ii) using the combustion gas of step (i) to preheat an alkaline source; and

(iii) transferring the heated starting material of step (i) and the heated alkaline source of step (ii) to a second reactor, adding an elemental carbon source, heating to a temperature of 700 to 1.100° C. and withdrawing process gas and a product stream.

2. The process according to claim 1, characterized in that the starting material is pre-heated in at least a first preheating stage to a temperature of 300 to 800° C. prior to step (i).

3. The process according to claim 1, characterized in that the starting material is pre-heated in multiple stages prior to step (i).

4. The process according to claim 1, characterized in that the alkaline source is pre-heated in a second preheating stage to a temperature of 200 to 500° C. prior to the introduction into the second reactor.

5. The process according to claim 1, characterized in that the alkaline source is selected from the group consisting of sodium carbonates, sodium hydroxides, potassium carbonates and potassium hydroxides or any combination thereof.

6. The process according to claim 5, characterized in that the alkaline source is soda ash.

7. The process according to claim 1, characterized in that the alkaline source is added in an amount of 2 to 80 wt.-% of the starting material.

8. The process according to claim 1, characterized in that the elemental carbon source is selected from the group consisting of pulverized lignites, dry sewage sludge, dry biomass, pulverized lignite, coal and coke or any combination thereof.

9. The process according to claim 1, characterized in that the elemental carbon source is added in an amount of 1 to 40 wt.-% of the starting material.

10. The process according to claim 2, characterized in that the combustion gases from step (i) are fed into a cyclone separator and subsequently into a Venturi section of the first preheating stage.

11. The process according to claim 1, characterized in that the combustion gases from step (i) are withdrawn from a cyclone separator, enter a Venturi section and are admixed with an alkaline source according to step (ii).

12. The process according to claim 1, characterized in that the process gas in step (iii) is cooled below the condensation temperature of the heavy metal compounds to allow for their precipitation and removal.

13. The process according to claim 12, characterized in that the heavy metal-free process gas is recycled into the first reactor.

* * * * *